May 25, 1965            H. P. GAY            3,184,962

STRAIN TYPE TRANSDUCERS

Filed July 13, 1962                                             2 Sheets-Sheet 1

*INVENTOR.*
HERMAN P. GAY
BY
*S. J. Rotondi & A. J. Dupont*

May 25, 1965    H. P. GAY    3,184,962
STRAIN TYPE TRANSDUCERS
Filed July 13, 1962    2 Sheets-Sheet 2

INVENTOR.
HERMAN P. GAY

United States Patent Office

3,184,962
Patented May 25, 1965

3,184,962
STRAIN TYPE TRANSDUCERS
Herman P. Gay, Rte. 1, Box. 360, Aberdeen, Md.
Filed July 13, 1962, Ser. No. 209,804
1 Claim. (Cl. 73—88.5)
(Granted under Title 35, U.S. Code (1952), sec. 266)

The invention described herein may be manufactured and used by or for the Government for governmental purposes without the payment to me of any royalty thereon.

This invention relates generally to an apparatus and a method for measuring physical quantities by the use of strain-type transducers.

More particularly the invention relates to a method of minimizing the change of sensitivity associated with a change of ambient temperature in strain-type transducers while measuring physical quantities of which acceleration, force, pressure, torque and displacement are a few examples.

In the present state of the art it is well known that a measuring instrument's reading will vary with the temperature of the condition being measured, as well as giving an indication of the condition itself. Where an electrical resistance strain gage is used to measure the condition and its change, the effect of temperature is especially noticeable. The magnitude of the error caused by a temperature variation is dependent on several factors. The more important sources of error arise from the gages themselves and the material upon which they are mounted. Since the observations from a strain test can be made valueless by improper temperature compensation, it becomes quite important to provide for a simple, yet accurate, means of proper compensation.

The variation of sensitivity caused by the change of resistance in the strain sensitive elements of the transducer can be minimized by using two or four elements to form a half or full Wheatstone bridge. This practice of using active and dummy elements is well known.

Compensation for the variation of sensitivity due to the temperature effect upon the material to which the strain sensitive element is mounted (modulus compensation) has been achieved in various ways in the past. The most common method of modulus compensation is achieved by the insertion of a resistor into the potential line of a Wheatstone bridge. This solution however, decreases the sensitivity of the device and requires a "hand made" resistor to provide proper compensation over the range of temperature involved.

Another method of modulus compensation of the material to which the strain sensitive element is bonded involves the use of two resistance elements in the resistance strain gage. The first resistance element is one in which the modulus of elasticity (Young's modulus) increases with an increase in temperature, and the second resistance element is then chosen so that its modulus of elasticity decreases in the same proportion with an increase in temperature as the first element increases. Needless to say, the two resistances must be such that their opposite effects are precisely counterbalancing. As a result, any variation by one of the resistances through use will provide a reading which may well be beyond the minimum accuracy desired for the device.

It is therefore an object of this invention to provide a method of improving a resistance-strain-type transducer so that the change of sensitivity, which is normally associated with a change of ambient temperature, is reduced to a minimum.

A further object of this invention is to provide an improved transducer of the strain type whose response to any applied strain is not affected by a change in the ambient temperature.

Another object of this invention is to provide a modulus compensated strain-type transducer which eliminates the use of a modulus compensated resistor in series with the supply voltage of the measuring bridge network.

Still another object of the invention is to provide a transducer that contains an element resistance strain gage such that the transducer will accurately respond to changing physical conditions regardless of any changing temperature and temperature gradients.

Still a further object of this invention is to provide a transducer that contains a single element resistance strain gage such that the transducer is compensated for any variation which may be caused by changes of resistance of the strain gage, dimensions of the materials, and the modulus of elasticity, produced by changes in the ambient temperature.

More specifically an object of this invention is to provide for a new combination of an electrically strain sensitive filament bonded to a material which is strained by the action of some physical phenomena, the selection of the combination being such that the characteristics of the strain sensitive filament combined with those of the strained material result in substantially zero change in sensitivity and substantially zero change of electrical resistance of said filaments due to change of temperature.

Another specific object of this invention is to provide for a new combination of electrically strain sensitive filaments bonded to a material which is strained by the action of some physical phenomena, the selection of the combination being such that the characteristics of the strain sensitive filaments combined with those of the strained material result in substantially zero change in sensitivity and substantially zero change of electrical resistance of said filaments due to change of temperature where the filaments form parts of a Wheatstone bridge circuit.

A previous patent application by the same inventor entitled "Quick Response, Temperature Corrected, Internal Type Pressure Gage," Serial No. 16,901, filed March 22, 1960, describes a strain-type pressure gage, of which the present disclosure is an extension.

The novel features that are considered characteristic of this invention are set forth with particularity in the appended claims. The invention itself, however, both as to organization and method of operation, as well as additional objects and advantages thereof, will best be understood from the following description when read in connection with the accompanying drawing, in which:

Figure 1:
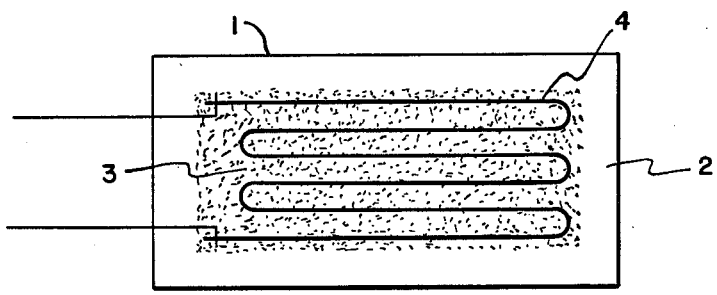
FIGURE 1 is a diagrammatic illustration of the strain sensitive element, or strain gage.

FIGURE 1 shows a bonded strain gage 1 which is used in my invention. Typical strain gages generally consist of; fine grids of metallic wire or ribbon, etched grids of metal foil, or a fine filament or grid of semi-conducting material, as for example, silicon. A very fine strain sensitive resistance element 4 is bonded onto the surface on which strain is to be measured. It should be noted that the measurement of strain in this manner requires the use of conductors of small cross section. This is due to the fact that the force necessary to strain the resistance element 4 must be transmitted through its surface by shear in the cement, indicated by the speckled area 3, and unless the surface area per unit length is large in relation to the cross-sectional area, the shearing stress in the cement will be too high to permit accurate following of the strains in the surface to which the resistance element 4 is attached. The strain gage further utilizes an insulating sheet 2, upon which resistance element 4 is bonded, to provide for proper electrical insulation of the element. Originally the strain gage resistance element was cemented directly to the surface of the material and the cement itself acted as an insulation. This practice, however, required a certain amount of skill on the part of the person installing the gage to achieve accurate results. The use of an insulation sheet, such as plastic or paper, is much more desirable since little skill is required to install the gage and the results obtainable are much more consistent and accurate.

Figure 2:
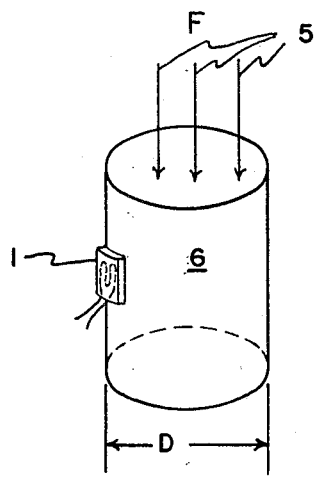
FIGURE 2 is a schematic showing of the usual type of force or thrust transducer.

As a first example consider the usual type of force or thrust transducer shown schematically in FIGURE 2, where strain gage 1 is used to measure a force designated by the arrows 5 upon a cylinder 6. The incremental longitudinal strain, $d\epsilon$, produced by an increment of applied force, $dF$, is given by:

(1) $$d\epsilon = \frac{dF}{AE}$$

or $$d\epsilon = \frac{4dF}{\pi D^2 E}$$

where $A$ = cross-sectional area of a strained cylinder at a right angle to its axis,
$D$ = diameter of the strained cylinder,
$E$ = Young's modulus of the cylinder.

The behavior of the strain sensitive element bonded to the cylinder is given by:

(2) $$f = \frac{dR/R}{d\epsilon}$$

where $f$ = gage factor
$R$ = electrical resistance of the unstrained element
$dR$ = change in resistance associated with $d\epsilon$.

The gage factor ($f$) is a constant of proportionality for a specific strain sensitive element supplied by the manufacturer from observed values of $R$ and $dR$ at various known increments of $d\epsilon$. The combination of Equations 1 and 2 then yields:

(3) $$\frac{dF}{dR} = \frac{\pi D^2 E}{4fR} = S$$

where $S$ = force-resistance sensitivity.

To a first order approximation, $f$ is substantially constant. The quantities $D$, $E$ and $R$ will vary with temperature. The variation of the sensitivity $S$ with the temperature $T$ can then be found by differentiating Equation 3 and dividing each side of the equation by the quantity $$\left(S = \frac{\pi D^2 E}{4fR}\right)$$

which yields:

(4) $$\frac{1}{S}\frac{dS}{dT} = 2a + \frac{1}{E}\frac{dE}{dT} - \frac{1}{R}\frac{dR}{dT}$$

where $$a = \frac{1}{D}\frac{dD}{dT}$$

the thermal expansion coefficient of metal to which the filament is bonded (cylinder 6).

The following well known relation holds approximately for an electrically strain responsive filament bonded to a metal subjected to zero mechanical strain and a change in ambient temperature:

(5) $$\frac{1}{R}\frac{dR}{dT} \approx b - f(c-a)$$

where $b$ = temperature coefficient of resistance of the bonded filament,
$c$ = thermal expansion coefficient of the strain sensitive element.

The table below shows the importance of the various terms of Equation 4. (All coefficients are per °C., multiplied by $10^{-6}$; except $f$.)

Strain sensitive element-advance alloy $[b = \pm 20 \quad c = 14.9 \quad f = 2]$

|  | Filament Bonded To— | |
|---|---|---|
|  | Steel | Dural |
| $2a$ | +22 | +46 |
| $\frac{1}{E}\frac{dE}{dT}$ | −250 to −270 | −583 |
| $\frac{1}{R}\frac{dR}{dT}$ | −28 to +12 | −4 to +36 |
| $\frac{1}{S}\frac{dS}{dT}$ (approx.) | −246 | −521 |
| Variation of S for $dT = 50°$ C. | 1.2% | 2.6% |

Note that the term $$\frac{1}{E}\frac{dE}{dT}$$

is very much greater than the other terms. As a consequence, the sensitivity changes several percent when the temperature changes 50° C. (90° F.) Although the above data are for strain sensitive elements of advance alloy, this should not be construed as a limitation of the technique. Other kinds of strain sensitive elements and metals to which they are bonded will only change the numbers in the table.

In the past the variation of R has been given the most attention because it produces an obvious "zero drift" on the indicating instrument. This variation of R generally has been minimized by using two or four strain sensitive elements to form a half or a full Wheatstone bridge. More recently however, strain sensitive elements have been constructed in which the parameters $a$, $b$, $c$ and $f$, are selected so that the variation of R is substantially zero according to Equation 5.

Compensation for the term $2a$ and the variation of E has been accomplished in part by inserting a resistor in the line carrying potential to the bridge, or by using two resistance wires which are chosen to provide a strain gage that has a sensitivity change versus temperature that is equal to the change in modulus with temperature of a given material of which the material is formed, and to which the gage is mounted. In the former compensation the magnitude of the line resistor and its change of resistance with temperature are selected so that the potential across the bridge correspondingly changes with temperature and thus minimizes the change in sensitivity.

In my invention the change in sensitivity is made substantially zero by making the algebraic sum of the terms on the right hand side of Equation 4 sensibly equal to zero. The desired value of the second term of Equation 4, the thermoelastic coefficient, is obtained by using an alloy such as "Ni-Span C" for the strained member of the transducer. By slight variations in the Chromium-Titanium-Carbon content and by the use of different heat treating temperatures, the thermoelastic coefficient can be varied from $+30 \times 10^{-6}$ per ° C. to $-25 \times 10^{-6}$ per ° C. Thus, by the use of a material for the bonded filament such that $\frac{1}{R}\frac{dR}{dT}$ is substantially zero, the variation of sensitivity can be minimized by also making $$\frac{1}{E}\frac{dE}{dT}+2a$$

substantially zero as described above. The result is that both the sensitivity and the resistance of the gage are substantially independent of temperature changes.

It should be remembered also that $$\frac{1}{R}\frac{dR}{dT}$$

can be made effectively zero by using either two or four strain sensitive elements in a Wheatstone bridge as pointed out previously. In this case the method of the preceding paragraph likewise applies.

In most cases the usual engineering formulas for the strain, etc., together with the assumptions that $a$, $b$, $c$ and $f$ are constant with temperature result in adequate designs for temperature compensation. To provide the best compensation over a very wide range of temperature it may be necessary to carry out some experiments to establish the actual deviations from the assumptions. For example the value of $a$, the thermal expansion coefficient, generally can be found for various materials at various temperatures in the International Critical Tables, or it can be measured by the use of well known techniques. The thermoelastic coefficient, $$\frac{1}{E}\frac{dE}{dT}$$

has been determined for various metals by the Bureau of Standards and also by commercial firms that produce special alloys. The variation of resistance with temperature, $$\frac{1}{R}\frac{dR}{dT}$$

can be established by measuring at various temperatures the resistance of the strain sensitive element bonded to a specimen of the metal to be used. This measurement of $R$ includes the variation of $f$, according to Equation 5. The data are plotted versus temperature so that resulting curves show the contribution of each term of Equation 4 to the variation of sensitivity at the different temperatures. In this way the various parameters can be readjusted, if necessary, so that the change of sensitivity is practically zero over the desired range of temperature.

This general technique may be applied to all strain type transducers provided it is used properly. However, before considering the general application, another specific application will be discussed.

Figure 3:
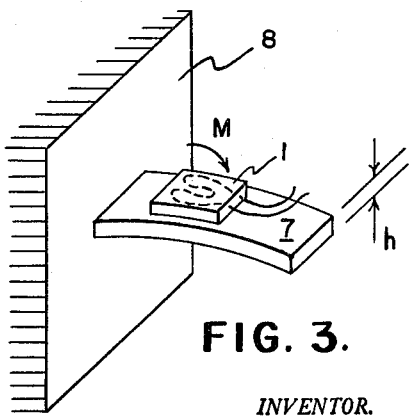
FIGURE 3 is a schematic showing of the strain gage mounted on a beam, the combination forming a transducer for measuring acceleration, force, or deflection.

A transducer in which the strain sensitive element is subjected to a bending moment is shown in FIG. 3. In this example, strain gage 1 is mounted upon a beam 7, the latter being connected to any support member designated by reference character 8. The incremental bending strain, $d\epsilon$, associated with the incremental bending moment, $dM$, is given by:

(6) $$d\epsilon = \frac{h\,dM}{2EI}$$

where $h$ = depth of beam,
$I$ = area moment of inertia with respect to the centroidal axis.

Combining Equations 6 and 2:

(7) $$\frac{dM}{dR} = \frac{2EI}{fRh} = S$$

and differentiating Equation 7 with respect to $T$, remembering that $I/h$ has the dimension (length)$^3$, yields:

(8) $$\frac{1}{S}\frac{dS}{dT} = 3a + \frac{1}{E}\frac{dE}{dT} - \frac{1}{R}\frac{dR}{dT}$$

The above equation is the same as Equation 4 except that the term $2a$ in Equation 4 becomes $3a$ in Equation 8.

Where the beam 7 is used to measure an incremental force, $dF$, the result is identical to Equation 4, as shown below:

(9) $$dM = l\,dF$$

where $l$ = distance from the applied force to the strain sensitive element.

Then:

(10) $$\frac{dF}{dR} = \frac{2EI}{fRhl} = S$$

and:

(11) $$\frac{1}{S}\frac{dS}{dT} = 2a + \frac{1}{E}\frac{dE}{dT} - \frac{1}{R}\frac{dR}{dT}$$

which is the same as Equation 4.

Considering now a third case where the beam 7 is used to measure an incremental deflection, $dy$, of the centroidal axis, then:

(12) $$dy = \frac{L^3\,dF}{3EI}$$

where $L$ = distance from the point where the deflection is measured to the root of the beam. Then:

(13) $$\frac{dy}{dR} = \frac{2L^3}{3fRhl} = S$$

and:

(14) $$\frac{1}{S}\frac{dS}{dT} = a - \frac{1}{R}\frac{dR}{dT}$$

Note that in this case the thermoelastic coefficient does not affect the variation of sensitivity. The variation of sensitivity can be minimized by making the strained member of a low expansion alloy such as "Modulvar" and simultaneously minimizing $$\frac{1}{R}\frac{dR}{dT}$$

as previously pointed out.

Remember that the beam arrangement shown in FIGURE 3 can be used as a transducer for measuring acceleration, $\alpha$, by fastening a weight, $W$, to the end of the beam so that:

(14a) $$F = \frac{W}{g}\alpha$$

($g$ = acceleration of gravity)

in which case, the variation of acceleration-resistance sensitivity with temperature is the same as that of the force-resistance sensitivity because the relation above is not affected by temperature. Remember, in addition, that the transducer shown in FIGURE 1 could be adapted to measure acceleration and also deflection, as well as force.

Figure 4:
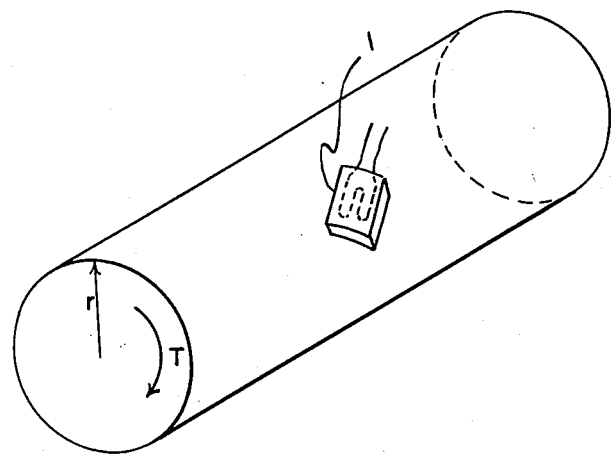
FIGURE 4 shows a transducer for measuring torque.

The transducer (shaft) shown in FIGURE 4 generally is used to measure torque. By fastening a mass of relatively large polar moment of inertia to the free end of the shaft, it can be used to measure the angular acceleration. This transducer, as well as other kinds, as for example those using a diaphragm for the strained member, could be analyzed. However, it will be found that the mechanical arrangement for transforming the quantity to be measured into a change of resistance has no influence on the variation of the sensitivity, $$\frac{1}{S}\frac{dS}{dT}$$

with temperature. The mechanical arrangement does influence the sensitivity itself and other properties such as the natural frequency of the transducer, but it does not affect the quantity $$\frac{1}{S}\frac{dS}{dT}$$

In all cases, the general formula below can be used:

(15) $\qquad \frac{1}{S}\frac{dS}{dT}=na+m\frac{1}{E}\frac{dE}{dT}-\frac{1}{R}\frac{dR}{dT}$ The appropriate values of $n$ and $m$ for some of the different measurements are tabulated below:

| Measurement | n | m |
|---|---|---|
| Force per unit area | 0 | 1 |
| Displacement | 1 | 0 |
| Force, acceleration | 2 | 1 |
| Torque, bending moment, angular acceleration | 3 | 1 |

In the measurements which involve a torsional strain upon the filament, Young's modulus, E, should be replaced by the modulus of rigidity, G. The two thermo-elastic coefficients are practically equal.

It should be noted that there are many different ways of electrically connecting the strain sensitive filaments to form the electrical circuit which transforms the change of resistance to a change of voltage. These various combinations do not alter the essential features of Equation 15. However, it should be remembered that if two or more strain sensitive filaments are used to form a Wheatstone bridge, the variation of resistance with temperature is effectively eliminated as will be described below. This method is useful when $$\frac{1}{R}\frac{dR}{dT}$$

is very large compared to the other terms of Equation 15. The most noteworthy cases are those where semiconductor strain gages are used.

The Wheatstone bridge has been used quite extensively with strain sensitive elements because it can increase the sensitivity or output signal of the measuring system and it minimizes the "zero drift" associated with the change of resistance due to change of temperature of the strain sensitive elements which form the resistors in the bridge.

In an initially balanced bridge composed of two or four identical strain sensitive elements, the ratio of the unbalance voltage, $de$, to the bridge voltage, $e$, is given by:

(16) $\qquad \frac{de}{e}=K\frac{dR}{R}$ where $K=$ a constant depending on the number of active gages and circuit efficiency,
$R=$ resistance of the strain sensitive element,
$dR=$ change of resistance associated with the change of strain.

It should be noted that the ratio $de/e$ is independent of temperature when two adjacent arms of the bridge are made up of strain sensitive elements of the same type, bonded to the same material and at the same temperature.

In many transducers the four arms of the bridge are an integral part and the sensitivity, $s$, is sometimes expressed as:

(17) $\qquad s=\dfrac{dF}{de/e}$ where $s=$ change in force per millivolt per volt.
Combining Equations 16 and 17 yields:

(18) $\qquad s=\dfrac{R}{K}\dfrac{dF}{dR}$ while the combination of Equations 3 and 17 results in:

(19) $\qquad s=\dfrac{RS}{K}$

The differentiation of Equation 19 with respect to temperature shows that:

(20) $\qquad \frac{1}{s}\frac{ds}{dT}=\frac{1}{R}\frac{dR}{dT}+\frac{1}{S}\frac{dS}{dT}$ Substituting the value of $$\frac{1}{S}\frac{dS}{dT}$$

from Equation 4 then yields:

(21) $\qquad \frac{1}{s}\frac{ds}{dT}=2a+\frac{1}{E}\frac{dE}{dT}$

Thus, the variation of resistance has no effect on the sensitivity, $s$, of the system. This can be explained physically as follows: As the temperature increases, for example, the resistance increases and this increases the change of resistance associated with a given strain; but at the same time the current through the resistance (strain sensitive element) correspondingly decreases so that the net effect on the sensitivity $s$ is zero.

It is important to distinguish between S and $s$ because in S the term $$\frac{1}{R}\frac{dR}{dT}$$

is present, whereas it is not in $s$. It should also be pointed out that sometimes the reciprocal of the sensitivity is used. This does not change the essential features of the remarks above, but merely changes the signs of the terms on the right hand side of Equations 4 and 21.

A few of the advantages which are realized through the use of my invention will now be described.

In a transducer consisting of four strain sensitive elements arranged to form a Wheatstone bridge, the modulus compensating resistor is not required. This resistor, which is used in the prior devices, must have very specific properties for each transducer of any specific kind. As a result, the resistor has to be "hand made or tailored" to each transducer and each transducer must be checked over the range of temperature by the manufacturer to insure that the compensation is adequate. This time-consuming and expensive process is eliminated by my invention. Normal quality control of the strain sensitive elements and the strained member of the transducer will produce the desired compensation over the range of temperature.

When the modulus compensating resistor is eliminated, the user's calibration of the measuring system (consisting of the transducer, electrical circuit, amplifier and indicator or recorder) is simplified. The conventional system must be calibrated by applying a known force (or deflection, etc.) to the transducer to establish the proper way to electrically simulate the output of the transducer associated with the applied force. Since the calibration must be carried out at each temperature, this usual method is time-consuming and expensive for the user. With the elimination of the modulus compensating resistor by my invention, the measuring system can be calibrated by the series method which is somewhat more convenient and practical.

However, even the series method requires that the resistance of six or eight components (the four arms of the bridge, the leads, etc.) be known accurately at each temperature. To carry out the calibration over a range of temperature takes time and is subject to accidental errors. In addition, the series method introduces non-linear effects in the calibration itself. These non-linearities may be as large as 0.4%.

Figure 5:
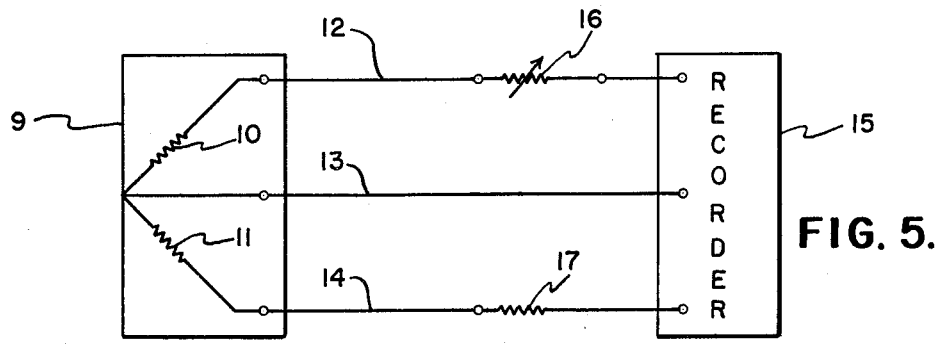
FIGURE 5 is a diagram of the measuring system in which a half bridge is used.

To provide a simple accurate method of calibrating the measuring system a half bridge can be used as shown in FIG. 5. As indicated previously the half bridge is used to eliminate the variation $$\frac{1}{R}\frac{dR}{dT}$$

when it is large compared to the other terms of Equation 15. The system comprises generally a transducer 9 which is made up of a pair of adjacent strain sensitive elements 10 and 11. Lead wires 12, 13, and 14 connect the strain sensitive elements to the remainder of the circuit which can consist of a dummy half bridge, a bridge voltage and a recording apparatus, indicated by reference character 15. A variable resistance 16 is inserted in line 12 and a similar resistance 17 is placed in line 14.

By my invention, the first two terms on the right hand side of Equation 15 are made zero so that the force (or deflection, etc.) resistance sensitivity of the transducer does not change with temperature. Thus, to accurately calibrate the measuring system at any temperature, the accurately known variable resistance 16 is connected in series with one arm of the bridge to simulate the output of the transducer. The similar resistance 17 is connected in the other arm of the bridge to maintain balance. Both of these resistors can be located at the recording apparatus 15 where the ambient temperature does not change significantly. Since the known variable resistance 16 accurately simulates (electrically) the output of the transducer 9, and since the output (or sensitivity) of the transducer does not change with temperature, the calibration of the measuring system at any temperature simply consists of changing the variable resistor 16 by known amounts. This method is simple, direct and accurate. The resistance of the leads 12–14, actual bridge resistance, bridge voltage, etc., all are unimportant. Only the sensitivity of the transducer and the change in resistance of variable resistance 16 need be known to obtain accurate measurements.

Since my invention eliminates the variation of force (or deflection, etc.) resistance sensitivity with temperature, a single strain sensitive element can be used in the transducer.

Figure 6:
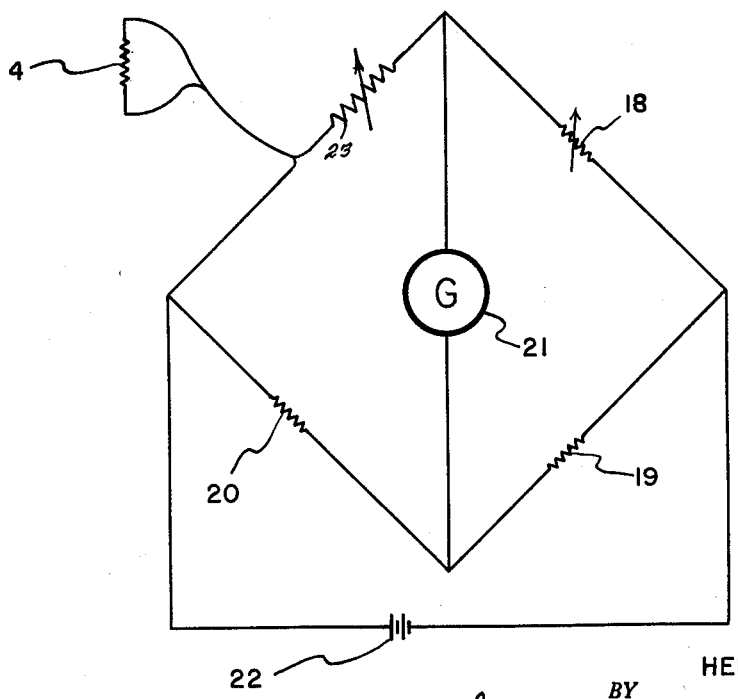
FIGURE 6 is a diagram of a Wheatstone bridge, which may be used in conjunction with the transducer to measure the change of condition.

FIGURE 6 shows a Wheatstone bridge circuit in which only one strain sensitive element is used. Strain sensitive element 4 is mounted upon the material at which the measurement takes place, while resistors 18, 19, and 20, galvanometer 21, voltage source 22, and the accurately known variable resistance, or calibrator 23 may be located at any convenient place within a reasonable distance from the gage. The Wheatstone bridge may also be used to measure dynamic physical changes if its galvanometer 21 is replaced by some suitable device such as high frequency oscillograph with its amplifiers and other auxiliary apparatus.

By the use of a single strain sensitive element, smaller, higher frequency transducers which are not affected by changes in ambient temperature can be constructed. The measuring system for such a transducer can be accurately calibrated by placing the variable resistor in series with the strain sensitive element essentially as described above.

In summary, my invention consists of a new combination of an electrically strain sensitive filament bonded to a material which is strained by the action of some physical phenomenon. The combination is selected so that the characteristics of the strain sensitive filament combined with those of the strained material result in substantially zero change in sensitivity and substantially zero change of electrical resistance of said filament. In the event that $$\frac{1}{R}\frac{dR}{dT}$$

(the variation of resistance with temperature) is very large, it can be minimized by using two identical filaments in adjacent arms of a Wheatstone bridge. The strained material is then selected so that the algebraic sum of the first two terms on the right hand side of Equation 15 is essentially zero. The result is that the "zero drift" (static balance of the bridge) and the variation of sensitivity with temperature are both substantially zero.

Although specific embodiments of this invention have been illustrated and described, it will be understood that these are but illustrative and that various modifications may be made therein without departing from the scope and spirit of this invention.

What is claimed is:

In a constant sensitivity strain-type transducer, the combination of a deformable element, a strain element comprising a single filament made of one continuous material whose electrical resistance varies with its strain, and means so bonding said single filament to the surface of said deformable element that the said single filament is directly responsive to a change of physical phenomena associated with said deformable element, said deformable element being made of such heat-treated alloy that $$na + m\frac{1}{E}\frac{dE}{dT}$$

substantially equals $$\frac{1}{R}\frac{dR}{dT}$$

where $a$ is the thermal expansion coefficient of the deformable element, $n$ and $m$ are constants dependent upon the physical phenomenon being measured, $E$ is Young's modulus of the deformable element, $R$ is the electrical resistance of said single filament bonded in place, and $T$ is the temperature, wherein the combination is so selected that the characteristics of said single filament combined with those of the deformable element result in substantially zero changes in sensitivity and electrical resistance of said single filament.

References Cited by the Examiner

UNITED STATES PATENTS

| | | | |
|---|---|---|---|
| 2,767,974 | 10/56 | Ballard et al. | 73—141 X |
| 2,920,298 | 1/60 | Hines | 73—88.5 X |

RICHARD C. QUEISSER, *Primary Examiner.*

DAVID SCHONBERG, *Examiner.*